United States Patent
Fechter et al.

(10) Patent No.: US 7,235,016 B2
(45) Date of Patent: Jun. 26, 2007

(54) UNIVERSAL JOINT LUBRICATION

(75) Inventors: Mark A. Fechter, West Bend, WI (US); Daryl J. Jaeger, Kewaskum, WI (US)

(73) Assignee: Weasler Engineering, Inc., West Bend, WI (US)

( * ) Notice: Subject to any disclaimer, the term of this patent is extended or adjusted under 35 U.S.C. 154(b) by 0 days.

(21) Appl. No.: 11/051,912

(22) Filed: Feb. 4, 2005

(65) Prior Publication Data

US 2006/0177261 A1 Aug. 10, 2006

(51) Int. Cl.
*F16C 11/06* (2006.01)
*F16D 3/80* (2006.01)
(52) U.S. Cl. ................... 464/118; 403/122; 403/37; 403/34
(58) Field of Classification Search ............ 464/7, 464/11, 117, 118, 905; 403/123, 135
See application file for complete search history.

(56) References Cited

U.S. PATENT DOCUMENTS

| | | | |
|---|---|---|---|
| 1,911,214 A | 5/1933 | Van Ranst | |
| 1,987,807 A | 1/1935 | Swenson | |
| 2,991,634 A | 7/1961 | Daley, Jr. | |
| 3,120,746 A | 2/1964 | Kayser | |
| 3,848,938 A * | 11/1974 | Stella et al. | 384/146 |
| 3,947,077 A * | 3/1976 | Berg et al. | 384/147 |
| 4,257,243 A * | 3/1981 | Herchenbach | 464/118 |
| 4,276,759 A | 7/1981 | Faulbecker | |
| 4,318,627 A | 3/1982 | Morin | |
| 4,464,136 A * | 8/1984 | Konrad et al. | 464/14 |
| 4,490,125 A * | 12/1984 | Konrad et al. | 464/11 |
| 4,650,439 A * | 3/1987 | Mayhew | 464/11 |
| 4,781,662 A * | 11/1988 | Mayhew et al. | 464/14 |
| 4,966,488 A * | 10/1990 | Mayhew | 403/135 |
| 5,125,672 A * | 6/1992 | Wycliffe | 277/351 |
| 5,419,740 A | 5/1995 | Koyari et al. | |
| 5,573,336 A * | 11/1996 | Maroney | 384/146 |

(Continued)

FOREIGN PATENT DOCUMENTS

EP 0469396 B1 2/1992

(Continued)

OTHER PUBLICATIONS

Applicants' Exhibit A—E. R. Wagner, P.E.; Saginaw Steering Gear Div., GMC: selected background materials regarding double Cardan universal joints; admitted prior art.

*Primary Examiner*—Daniel P. Stodola
*Assistant Examiner*—Joshua T. Kennedy
(74) *Attorney, Agent, or Firm*—Quarles & Brady LLP (57) ABSTRACT

A universal joint has a ball retainer having a retainer body made of a structurally rigid material and a relatively soft elastomeric seal bonded to the body at an axial end in a recess so as to wipe lubricant back on the ball that is retained by the body. Cavity plates in a housing of the universal joint partially close off lubricant reservoir recesses to retain lubricant in the reservoirs and act as wear plates that stabilize the centering plate orbiting in the recess. Seals can be provided between the retainer and the ball socket, between the centering plate and the wear plates and between the wear plates and the cavity plates. Passageways connect the center cavity of the housing with the ball sockets through an orifice.

16 Claims, 6 Drawing Sheets

U.S. PATENT DOCUMENTS

| | | |
|---|---|---|
| 5,688,065 A | 11/1997 | Mayhew |
| 6,616,536 B2 * | 9/2003 | Herchenbach et al. ...... 464/118 |
| 6,626,575 B2 * | 9/2003 | Hartl .......................... 384/145 |
| 6,688,799 B2 * | 2/2004 | Broker et al. ............... 403/135 |
| 6,719,636 B2 * | 4/2004 | Herchenbach et al. ...... 464/118 |
| 6,773,196 B2 * | 8/2004 | Broker et al. ............... 403/133 |

FOREIGN PATENT DOCUMENTS

GB      2196719 A      5/1988

\* cited by examiner

UNIVERSAL JOINT LUBRICATION

CROSS-REFERENCE TO RELATED APPLICATION

Not applicable.

STATEMENT CONCERNING FEDERALLY SPONSORED RESEARCH OR DEVELOPMENT

Not applicable.

FIELD OF THE INVENTION

This invention relates to improving lubrication in a universal joint, particularly in a double cardan universal joint.

BACKGROUND OF THE INVENTION

It is well known that universal joints, and in particular high angle double cardan universal joints, need lubrication over a prolonged period of high speed operation, without throwing the lubrication out due to centrifugal and other forces on the universal joint. This is discussed in U.S. Pat. Nos. 4,781,662 and 5,688,065, the disclosures of which are hereby incorporated by reference for their disclosures of universal joints, and in particular lubrication of universal joints.

Although universal joints are well known in the art, a problem persists in retaining lubricant in the joint for as long as possible. Typically, the joint is lubricated when new. After being placed in service, the joint may never be lubricated again. The joint is subjected to centrifugal forces in service, which tend to cause the lubricant to be thrown radially outward. The invention described herein is accordingly directed to retaining lubricant in the joint during operation.

SUMMARY OF THE INVENTION

The invention in one aspect provides an elastomeric seal for a ball and socket centering apparatus of a universal joint. According to the invention, an elastomeric seal is bonded to a metal or other rigid strong material ball retainer ring that has an internal spherical surface in sliding contact with the external spherical surface of a centering ball of the universal joint. The elastomeric seal is bonded at an outer end of the ball retainer so as to wipe against a spherical surface of the ball as the ball rotates relative to the ball retainer. The seal wipes against the ball as the ball rotates relative to the retainer to retain lubricant in the socket in which the ball is received.

In a preferred aspect, in a free state the seal extends radially inward relative to the retainer, beyond the spherical surface of the retainer so that when, if placed in mating contact with the retainer, the ball compresses the seal radially outward, so that the seal presses against the spherical surface of the ball with sufficient force to retain the lubricant in the socket.

In another aspect, the retainer spherical surface is shaped such that it interferes with withdrawal of the ball from the socket. Thereby, the seal is not subjected to the significant forces that act on the ball to withdraw it from the socket, but those are borne by the retainer which is made of a rigid material such as steel or another strong or rigid material.

A seal of the invention helps retain lubricant in the ball socket and helps keep dirt out of the socket and away from the ball retainer. The seal follows the contour of the outside of the ball as the drive line that includes the universal joint is angled. This feature decreases the need to lubricate the ball socket area more often and extends the mechanical life of the ball and socket.

In another aspect, the invention provides a universal joint housing that contains lubricant to lubricate a moving center plate and floating wear plates. Over a period of time, a housing of a constant velocity universal joint needs to be re-lubricated because the lubrication pumps out of the housing as the center plate moves to the outer edge of the lubricated cavity in the housing as the housing rotates. The invention seeks to increase the length of the lubrication period and decrease the wear generated in the sliding area of the housing by adding cavity plates on each face of the housing that also act as wear plates. Each cavity plate acts like a labyrinth mechanical seal as it captures the lubricant behind it in a reservoir groove in the housing. The reservoir replenishes the moving surfaces with lubrication in an extended period of time, decreasing the frequency of the need for lubrication. The pumping action of lubricant still takes place but the lubricant is captured in the reservoir behind the cavity plate, keeping the lubricant available longer as the lubricant in the cavity is used up.

In this aspect, the material of the cavity plate also acts as an enlarged wear area (enlarged relative to if it was not present) and therefore should be chosen to be strong and wear resistant. Some materials that may be used for these plates include spring steel, nylon and other wear resistant plastics and metals. By adding the cavity plates to the housing, it allows the floating wear plates to have more surface area to slide on and also keeps the center plate and sliding plates parallel so there is less binding from center plate tipping. This reduces friction when constant velocity universal joints are angled at high angles during operation.

In addition, seals can be provided between the retainer and the ball socket, between the centering plate and the wear plates and between the wear plates and the cavity plates. One or more lubrication passageways can be provided in the centering plate that communicate with the ball sockets through an orifice so as to regulate lubricant flow between the center cavity and the ball sockets.

The foregoing and other objects and advantages of the invention will appear in the detailed description which follows. In the description, reference is made to the accompanying drawings which illustrate a preferred embodiment of the invention.

DETAILED DESCRIPTION OF THE PREFERRED EMBODIMENT

Figure 1:
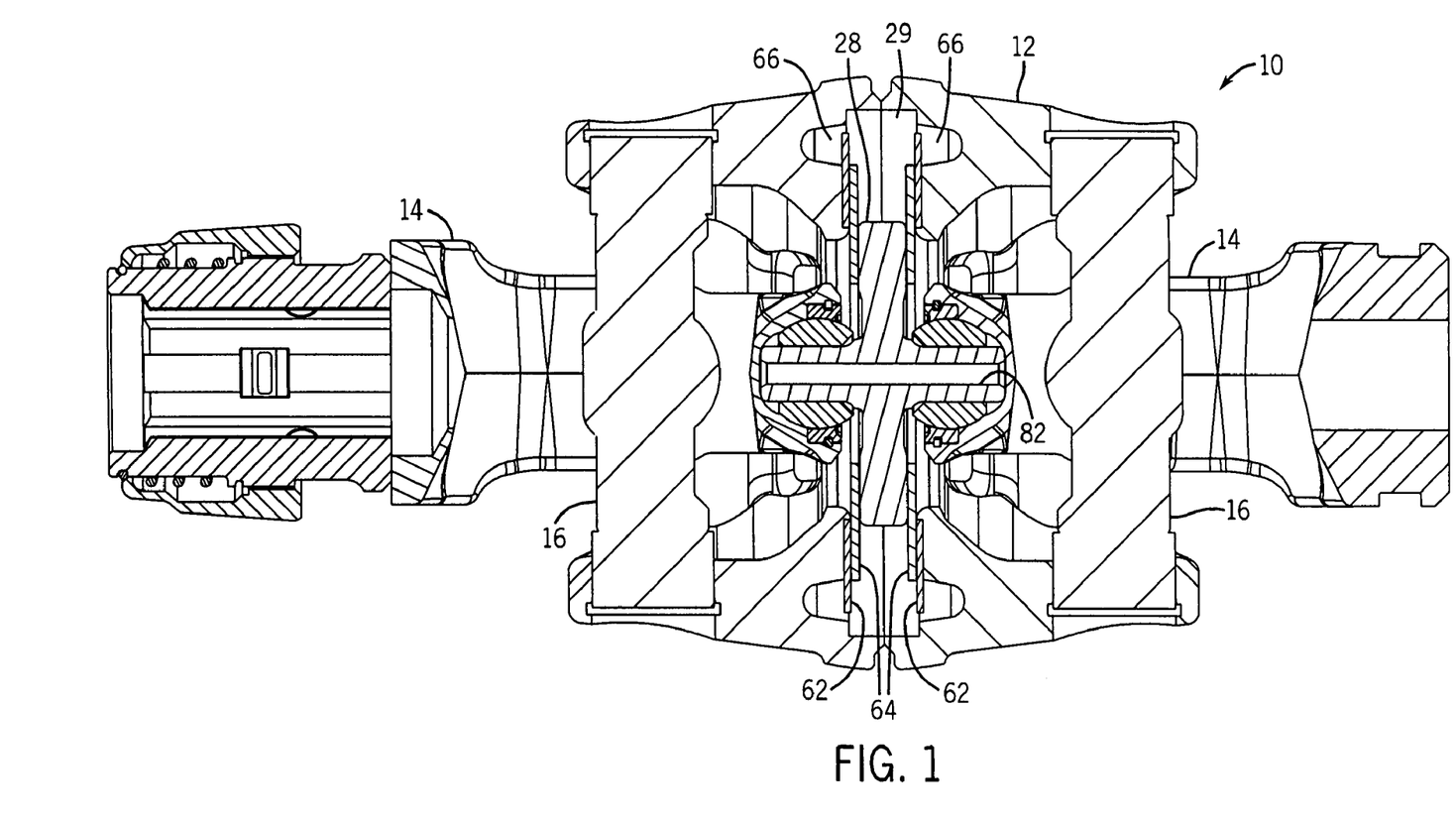
FIG. 1 is a cross-sectional view of a double cardan universal joint incorporating aspects of the invention.
Figure 2:
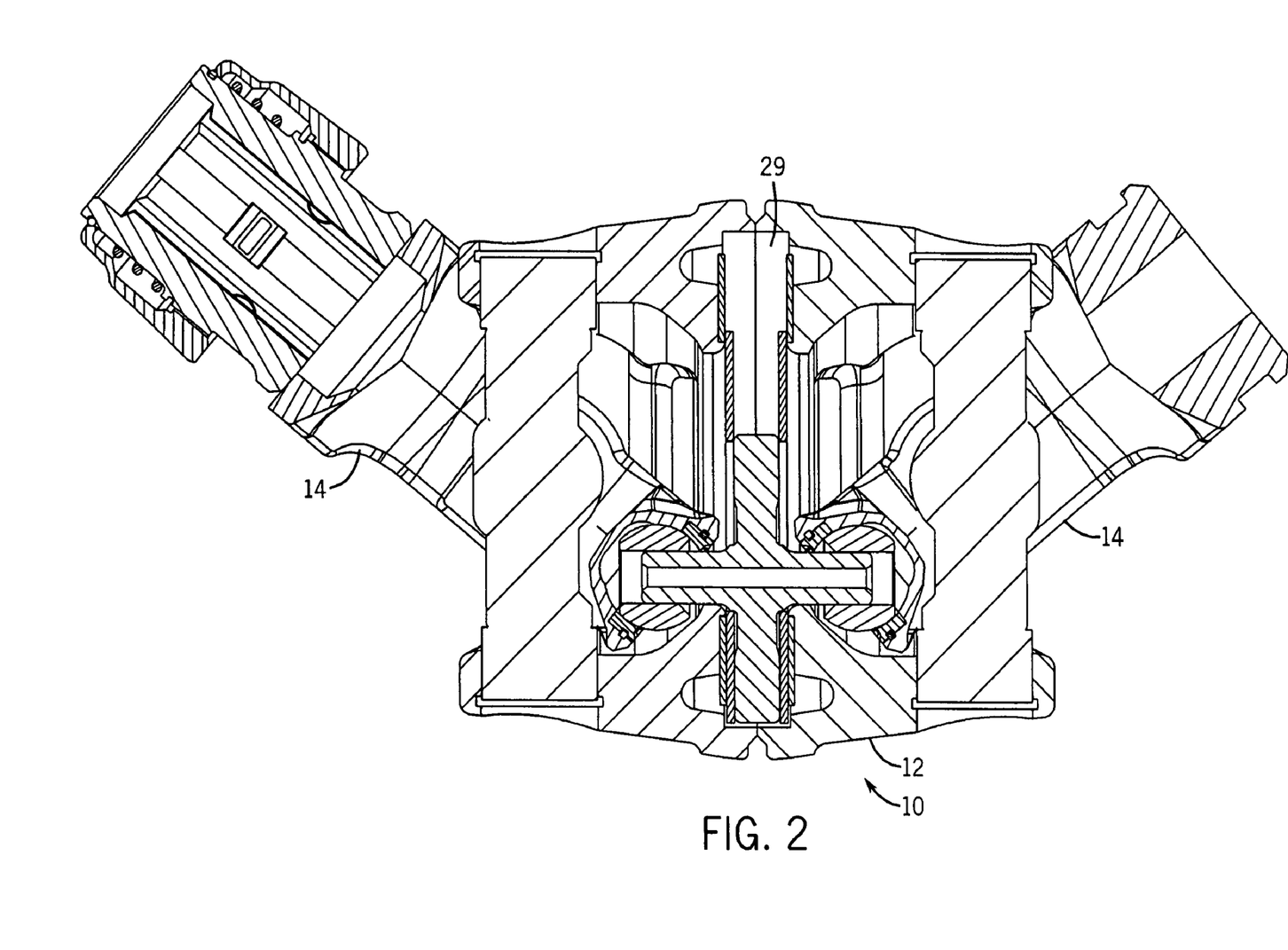
FIG. 2 is a cross-sectional view like FIG. 1 illustrating the universal joint of FIG. 1 at an extreme angle.

Referring to FIGS. 1 and 2, a double Hooke's type universal joint 10 has a housing 12 and a pair of yokes 14 connected to the housing 12 by a pair of respective cross links 16 in well known manner. Each yoke 14 defines at its inner end a ball socket 18 (FIG. 3) in which is received a ball 20 having an external spherical surface 22 and an internal cylindrical surface 24 in which is slidibly received a pin 26 of a centering plate 28 that slides in a center cavity 29 of the housing 12. The spherical surface 22 of the ball 20 mates with the internal spherical surface 29 of the ball cavity 18 and also mates with an internal spherical surface 30 of a ball retainer 32. The surface 30 captures the ball 20 in the ball socket 18 as it is made of steel or another rigid material that fixes the ball 20 in the socket 18 while permitting sliding movement of the spherical surface 22 against the spherical surfaces 30 and 28. The ball retainer 32 is held in the inner end of the yoke 14 by a snap ring 34 that fits in an external groove of the retainer 32 and fits in an internal groove in the end of the yoke 14.

Figures 3, 4, 5:
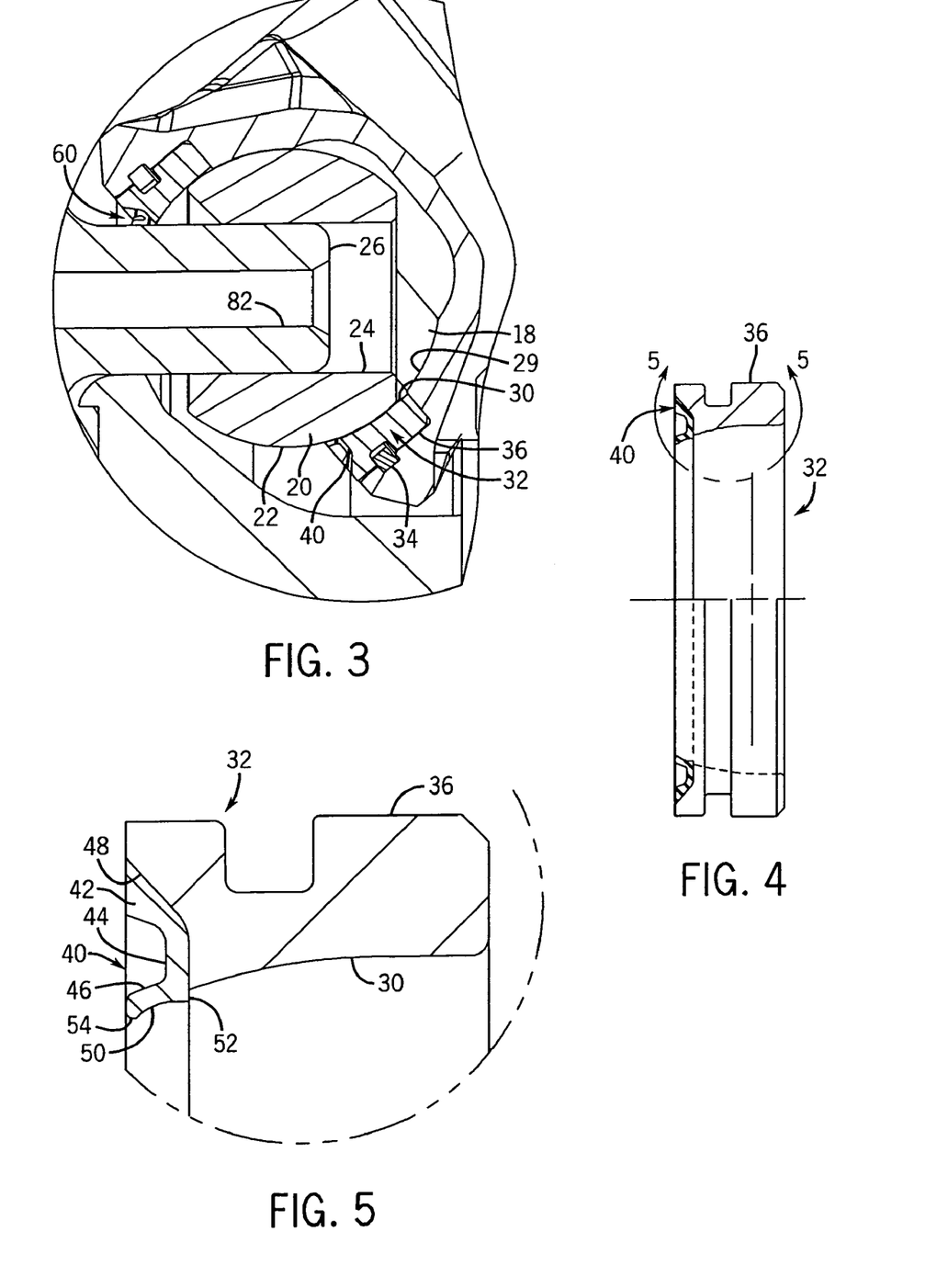
FIG. 3 is a detail view of the right-hand ball socket area of the universal joint of FIG. 2, the left-hand ball socket area being a mirror image of FIG. 3.
FIG. 4 is a partial section view of the ball retainer seal illustrated in FIGS. 1–3.
FIG. 5 is a detail view of the upper portion of FIG. 4.

The hard and rigid part of the retainer 32 is referred to as the body portion 36 of the retainer 32 and the seal portion 40 is referred to as such herein. The seal portion 40 is bonded in a recess at the exterior end of the body portion 36 and has a generally U-shaped cross-section as illustrated in FIGS. 4 and 5. The seal 40 is made of an elastomeric material such as a natural or synthetic rubber. One common material for the seal 40 found suitable is black viton.

As mentioned above, the body portion 36 of the retainer 32 is a relatively hard and rigid material such as steel, as it bears most of the load that retains the ball 20 in the ball socket 18. Referring to FIG. 5, the seal 40 has an outer leg portion 42, a connecting bridge portion 44 and an inner leg portion 46 extending from the inner end of the connecting portion 44. The outer portion 42 and the bridge 44 are bonded to the recessed surface 48 at the outer axial end of the body portion 36 of the retainer 32. The inner leg portion has a curved inner surface 50 that is shaped to conform to the spherical surface 22 of the ball 20 and that, in its free state, is radially inward of the surface 30 of the body portion 36. Thus, when the ball 20 is received in the retainer 32, the ball presses the surface 50 and the inner leg portion 46 radially outwardly with a force such that the coating of lubricant on the surface 22 of the ball 20 is wiped backwardly toward the ball recess 18 by edge 52 of the seal 40 so as to keep the lubricant largely inside of the edge 52. The opposite or outer end of surface 50, at 54 (its outer edge) is curved so as not to scrape or wipe lubricant on the surface 22 outwardly when the ball surface 22 retreats inwardly past the end 54. Thereby, lubricant on the surface 22 is impeded from going outside of the ball recess 18 past edge 52, and the reentry of the lubricant film on the surface 22 is facilitated by the shape of the end 54.

In addition, referring to FIG. 3, at an extreme angle of the universal joint, the inner leg 46 can resiliently deflect outward as shown at 60 in FIG. 3 when it comes into contact with the pin 26. When the angle is relieved, the seal 40 can spring back to its normal position, shown at the opposite side of the seal in FIG. 3. Or, if no ball is present immediately adjacent to the seal, the seal 40 can spring back to the position shown in FIG. 5.

Figure 6:
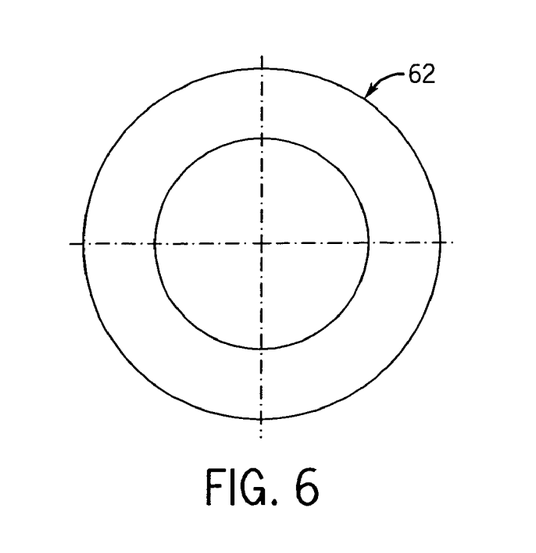
FIG. 6 is a axial plan view of one of the cavity plates illustrated in FIGS. 1 and 2.

In another aspect of the invention, the universal joint 12 has a pair of cavity plates 62 which are annular in shape as shown in FIG. 6. The cavity plates 62 are received in recesses formed in the housing 12, one on each side of the centering plate 28, so that they form surfaces against which wear plates 64 slide. The cavity plates 62 partially close off the open end of the lubrication reservoirs 66 that are formed in each half of the housing 12. By closing these openings of the reservoirs 66 off, the cavity plates 62 impede the escape of lubricant from the reservoirs 66.

In addition, since the cavity plates 62 enlarge the area of the wear surfaces of the cavity 29 defined by the housing 12 in which the centering plate 28 and wear plates 64 are received and orbit, they reduce wear of the wear plates 64. In addition they make it less likely that the centering plate 28 or wear plates 64 will tip relative to the housing 12 in the cavity 29 in which the centering plate 28 and wear plates 64 orbit. The cavity plate 62 should be made of a dimensionally stable material that presents a good wear surface, such as steel, nylon or a similar material. For example, one material found suitable is spring steel. The cavity plates 62 are received in grooves, one formed in each housing half (the housing halves are bolted together to form the housing 12) and are kept in these grooves by the centering plate 28 and wear plates 64 holding the cavity plates 62 spaced apart. However, the cavity plates 62 could be bonded or otherwise secured to each housing half.

Figure 7:
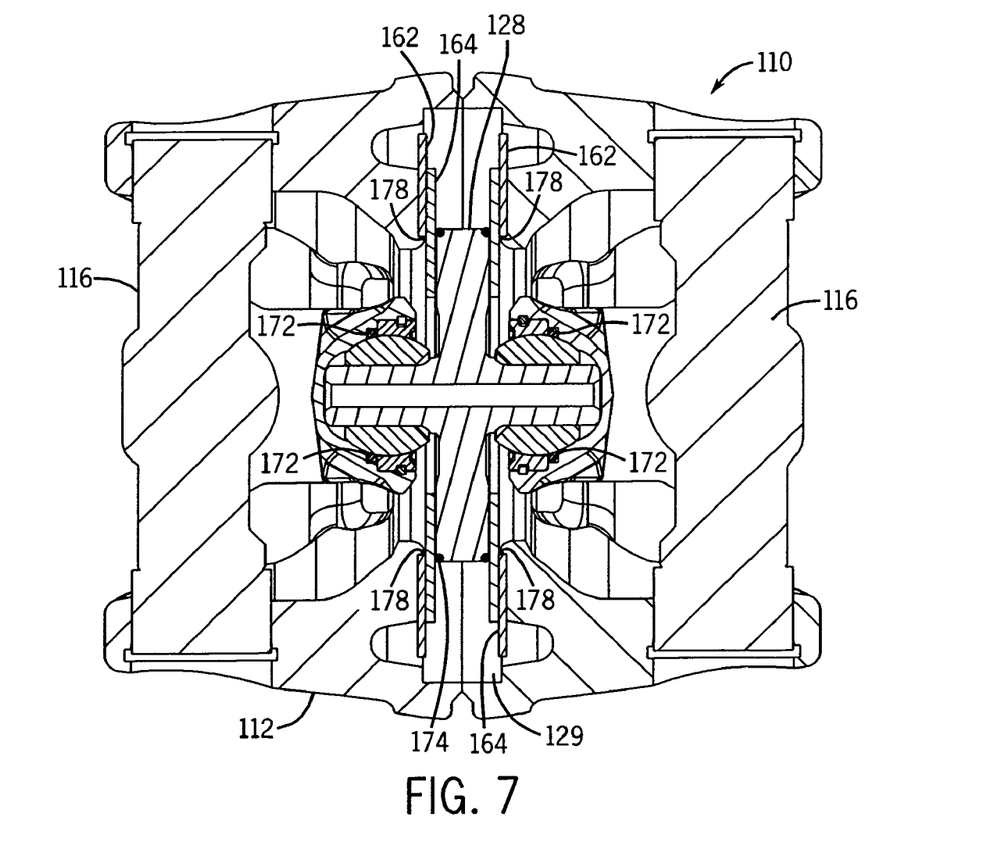
FIG. 7 is a view similar to FIG. 1 of a second embodiment of the invention.
Figure 8:
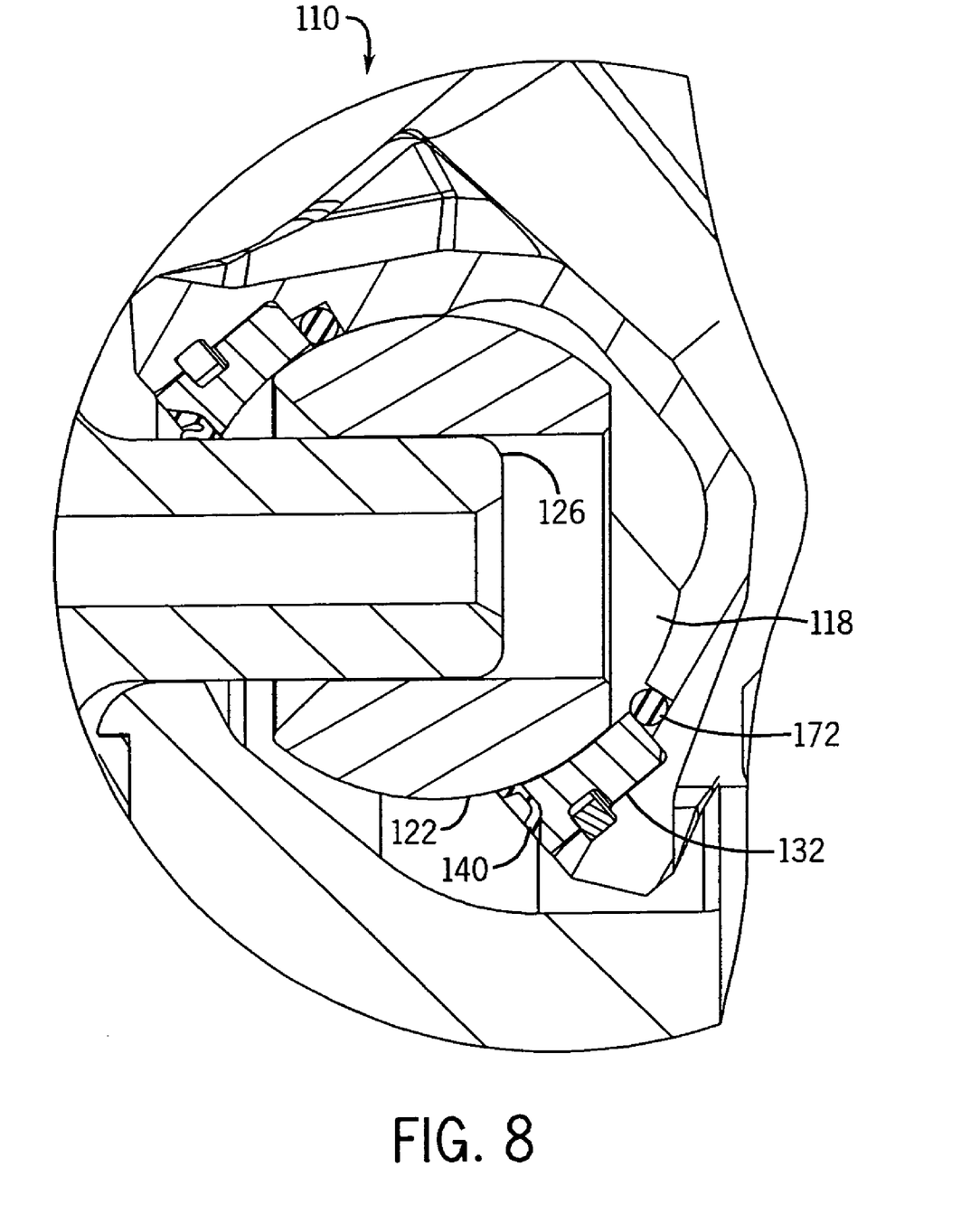
FIG. 8 is a view similar to FIG. 3 of the embodiment of FIG. 7.

FIGS. 7 and 8 illustrate a second embodiment 110 that is very similar to the first embodiment 10. In this embodiment, elements corresponding to elements of the first embodiment 10 are labeled with the same reference number plus 100.

The embodiment 110 differs from the embodiment 10 in that it has an additional seal 172 between the ball retainer 132 and the ball cavity 118, to help retain lubricant in the ball cavity, and has an additional seal 174 on each face of the centering plate 128, at each circumferential corner as illustrated in FIG. 7. A seal 178 is also provided at the inner diameter of each plate 162 and is bonded thereto to create a sliding seal with the adjacent plate 164 The seals 174 and 178 help retain lubricant in the center cavity 29 area of the housing 112. The seals 172 and 174 could be provided as o-ring seals as illustrated, or could be provided as bonded-on lip seals like the seal 40.

Figure 9:
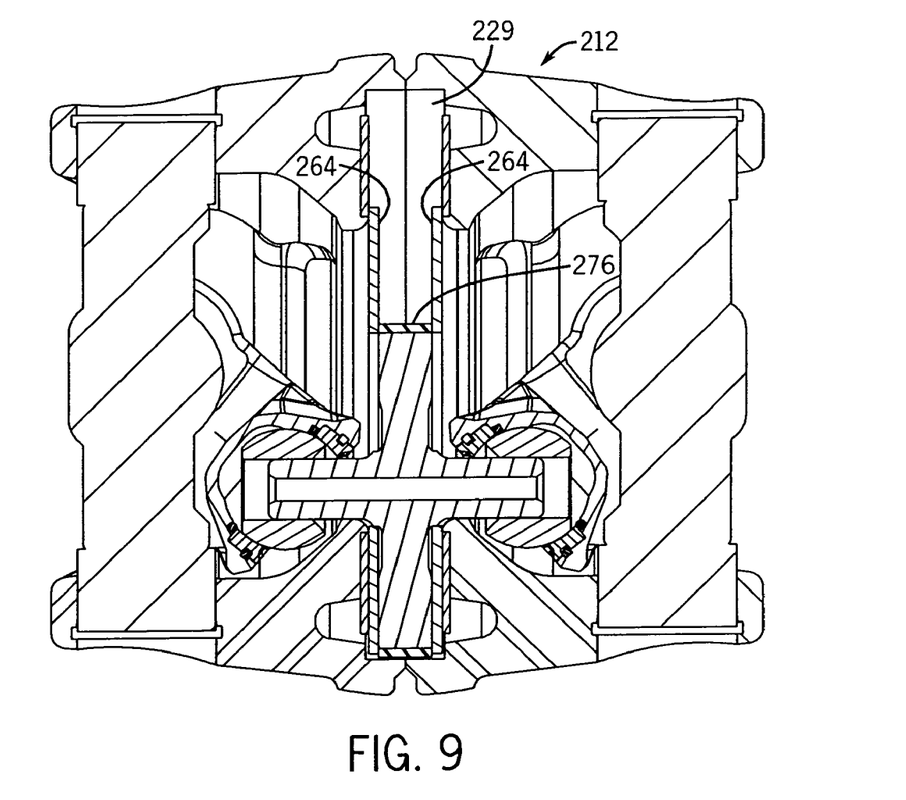
FIG. 9 is a view similar to FIG. 2 of a third embodiment of the invention.

A third embodiment 210 having additional seals is illustrated in FIG. 9. In this embodiment, elements corresponding to elements of the second embodiment 110 are labeled with the same reference number plus 100.

The embodiment 210 differs from the embodiment 110 by having an alternative for the seal 174, which is a band seal 276 provided around the outside circumference of the centering plate 28 as illustrated in FIG. 9. The edges of the seal 276 create a sliding seal with the plates 264 that helps retain lubricant in the center cavity 229 of the housing 212. Seals 172 are not illustrated in this embodiment, but could be.

Figure 10:
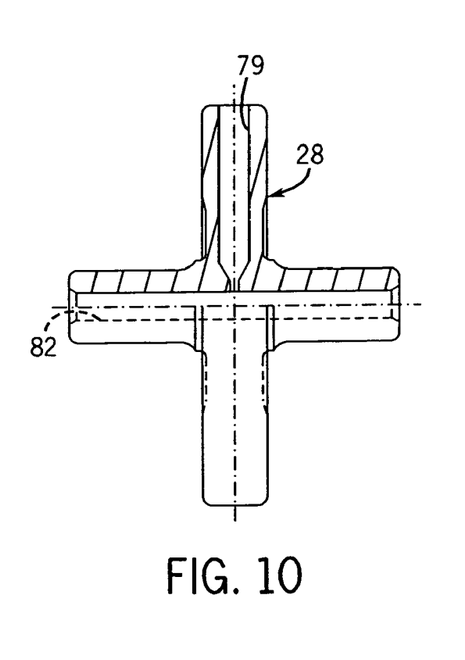
FIG. 10 is a partial cross-sectional view of an alternative centering plate for the three embodiments illustrated.
Figure 11:
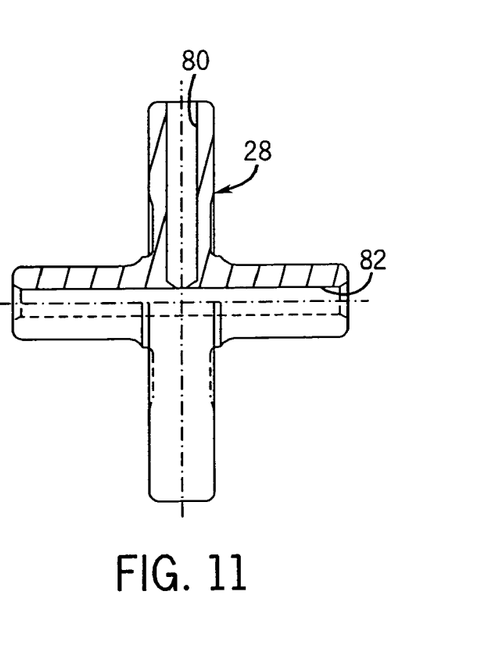
FIG. 11 is a view like FIG. 10 but of another alternative centering plate.

FIGS. 10 and 11 illustrate alternative lubrication passageways 79 and 80 running radially through the centering plate 28 that communicate with axial passageway 82 of embodiment 10. Only one is shown in each centering plate although more than one may be provided. The passageway 82 runs through the plate 28 and pins 26 to provide communication between the ball sockets 18, and the passageway 79 or 80 provides communication from the center cavity 29 of the housing to the passageway 82, and therefore to the ball sockets 18. FIG. 10 illustrates the passageway 79 made using a center drill and FIG. 11 illustrates the passageway 80 made using a standard drill bit and controlling the drill point break-through depth. Both passageways 79 and 80 have a smaller diameter hole at its inner end that acts as an orifice to regulate the flow of grease passing between the center cavity grease reservoir and the two ball sockets. This smaller diameter hole creates resistance to flow and therefore creates a pressure difference when filling with grease and when running. The passageways 79 or 80 can be applied to any of the embodiments of the invention.

Preferred embodiments of the invention have been described in considerable detail. Many modifications and variations to the preferred embodiments described will be apparent to persons skilled in the art. Therefore, the invention should not be limited to the preferred embodiments described, but should be defined by the claims which follow.

We claim:

1. In a double universal joint having a pair of yokes pivotally connected to one another by a housing and a centering apparatus between the yokes including a centering plate received in a cavity of the housing wherein surfaces of the cavity are defined at least in part by axially extending recesses, the improvement wherein at least one cavity plate is received in the cavity held axially and radially fixed relative to the housing such that the cavity plate at least partially closes off at least one of said axially extending recesses.

2. The universal joint of claim 1, wherein the cavity plate is annular.

3. The universal joint of claim 1, wherein two cavity plates are provided, and each cavity plate partially closes at least one axially extending recess, one on each side of the centering plate.

4. The universal joint of claim 1, wherein an axially inwardly facing surface of the cavity plate provides an enlarged wear surface.

5. The universal joint of claim 1, wherein at least one wear plate is provided between the cavity plate and the at least one centering plate, the wear plate sliding against an axially facing surface of the centering plate and sliding against an axially facing surface of the at least one cavity plate.

6. The universal joint of claim 5, wherein at least one elastomeric seal is provided between the centering plate and the at least one wear plate.

7. The universal joint of claim 5, wherein at least one elastomeric seal is provided between the at least one wear plate and the at least one cavity plate.

8. The universal joint of claim 1, wherein the cavity plate is received in a recess of the cavity in which the centering plate orbits.

9. In a double universal joint having a pair of yokes pivotally connected to one another by a housing and a centering apparatus between the yokes including a centering plate received in a cavity of the housing wherein surfaces of the cavity are defined at least in part by axially extending recesses, the improvement wherein a pair of cavity plates are provided in the recess, one on each side of the centering plate, and the cavity plates are fixed axially and radially so as to partially close off an opening into an axially extending lubrication reservoir recess.

10. The universal joint of claim 9, wherein the cavity plate is annular.

11. The universal joint of claim 9, wherein two cavity plates are provided, and each cavity plate partially closes at least one axially extending lubrication reservoir recess, one on each side of the centering plate.

12. The universal joint of claim 9, wherein an axially inwardly facing surface of the cavity plate provides an enlarged wear surface.

13. The universal joint of claim 9, wherein a wearplate is provided between the cavity plate and the centering plate, the wear plate sliding against an axially facing surface of the centering plate and sliding against an axially facing surface of the cavity plate.

14. The universal joint of claim 9, wherein the cavity plate is received in a recess of the cavity in which the centering plate orbits.

15. The universal joint of claim 9, wherein at least one elastomeric seal is provided between the centering plate and the wear plates.

16. The universal joint of claim 9, wherein at least one elastomeric seal is provided between the wear plates and the cavity plates.

* * * * *

UNITED STATES PATENT AND TRADEMARK OFFICE
CERTIFICATE OF CORRECTION

PATENT NO. : 7,235,016 B2  
APPLICATION NO. : 11/051912  
DATED : June 26, 2007  
INVENTOR(S) : Fechter et al.

Page 1 of 1

It is certified that error appears in the above-identified patent and that said Letters Patent is hereby corrected as shown below:

Col. 6, Claim 13, line 28

"13. The universal joint of claim 9, wherein awearplate is"

Should be

--13. The universal joint of claim 9, wherein a wear plate is--

Signed and Sealed this

First Day of April, 2008

JON W. DUDAS  
*Director of the United States Patent and Trademark Office*